United States Patent
Fujieda et al.

(10) Patent No.: US 7,742,634 B2
(45) Date of Patent: Jun. 22, 2010

(54) IMAGE PROCESSING METHOD, THREE-DIMENSIONAL POSITION MEASURING METHOD AND IMAGE PROCESSING APPARATUS

(75) Inventors: Shiro Fujieda, Otokuni-gun (JP); Yasuyuki Ikeda, Ayabe (JP)

(73) Assignee: Omron Corporation, Kyoto-Shi (JP)

( * ) Notice: Subject to any disclaimer, the term of this patent is extended or adjusted under 35 U.S.C. 154(b) by 1079 days.

(21) Appl. No.: 11/373,494

(22) Filed: Mar. 13, 2006

(65) Prior Publication Data
US 2006/0221417 A1 Oct. 5, 2006

(30) Foreign Application Priority Data
Mar. 15, 2005 (JP) ............................ P2005-072989

(51) Int. Cl.
*H04N 1/46* (2006.01)
*G06K 9/00* (2006.01)

(52) U.S. Cl. ....................... 382/154; 382/173; 382/199; 358/538

(58) Field of Classification Search ................. 382/154, 382/173, 199; 358/538
See application file for complete search history.

(56) References Cited

U.S. PATENT DOCUMENTS
2004/0105579 A1* 6/2004 Ishii et al. .................... 382/154

FOREIGN PATENT DOCUMENTS
JP 2002-230549 8/2002
JP 2002230549 A * 8/2002

* cited by examiner

Primary Examiner—Brian P Werner
Assistant Examiner—Michael Vanchy, Jr.
(74) Attorney, Agent, or Firm—Foley & Lardner LLP

(57) ABSTRACT

An object of this invention is to provide an image processing method and image processing apparatus capable of extracting the position of an object in the unit of sub-pixel. An edge pixel, density gradient direction and edge position in the unit of sub-pixel are extracted from a model image obtained by photographing a high-quality model of the object and registered in a hard disk. After a processing object image is inputted, CPU obtains a position of an image region corresponding to the model image and after that, extracts an edge pixel whose edge position in the unit of sub-pixel is related to a corresponding pixel on the model image side in that image region. The edge position in the unit of sub-pixel is extracted for these edge pixels and the quantity of deviation between the extracting position and the edge position on the model image side is calculated. The position in the unit of pixel is corrected with an average value of the quantity of deviation obtained for each edge pixel so as to obtain a real position of the object.

7 Claims, 6 Drawing Sheets

(1) Registration object image (2) Processing object image

IMAGE PROCESSING METHOD, THREE-DIMENSIONAL POSITION MEASURING METHOD AND IMAGE PROCESSING APPARATUS

CROSS-REFERENCE TO RELATED PATENT APPLICATIONS

This application claims priority from Japanese patent application P2005-072989, filed on Mar. 15, 2005. The entire content of the aforementioned application is incorporated herein by reference.

FIELD OF THE INVENTION

The present invention relates to a method and apparatus for processing gray image data including a predetermined object and extracting the position of the object on an image in order to measure and inspect the predetermined object.

DESCRIPTION OF THE RELATED ART

According to a general method for extracting an object from the gray image, an image obtained by photographing a model as an object (called "model image" in this specification) is registered preliminarily and an image region corresponding to this model image is extracted from this object image.

As a typical method for extracting the image region corresponding to the model image, a method which executes normalization correlative operation using the gray data of each composition pixel has been well known. Further, a method of obtaining the direction of change in density (density gradient direction) of an edge pixel in an image (which means a pixel which constitutes an edge) in a processing object image or model image and comparing the distribution pattern of the direction of the change has been proposed (see patent document 1).

Patent document 1: Japanese Patent Application Laid-Open No. 2002-230549

The conventional method by the normalization correlative operation has such a problem that when processing an image having a complicated background or a low contrast, a satisfactory extraction accuracy cannot be secured. Further, if the object has any fault in shape such as a chipping or burr, there is a fear that an image region corresponding to the model image cannot be extracted.

Because this method executes the correlative operation by scanning the model image by each pixel for a processing object image, the position of the object cannot be obtained except by the unit of pixel. Although a method of calculating the vertex of a parabola on an assumption that the change of similarity obtained at each scanning position is approximate to the parabola in order to obtain the position of each sub-pixel has been proposed, it cannot be always said that this kind of the change in similarity is approximate to the parabola, there is such a problem that a highly reliable calculation cannot be performed.

On the other hand, the method of comparing the patterns of the density gradient direction is not likely to be affected by noise such as shading and has a merit that it can extract even an object containing a fault like chipping, burr and the like. However, because the comparison of a processing object image with a model image is carried out in the unit of pixel, even if the position of the edge of the object changes in sub-pixel level, the density gradient direction of a pixel cross- ing that edge does not change so that the change in the position cannot be extracted easily.

SUMMARY OF THE INVENTION

The present invention has been accomplished in views of the above-described problem and an object of the invention is to provide an image processing method and image processing apparatus capable of extracting the position of an object in the unit of sub-pixel and suitable for high precision positioning and measurement processing.

According to the image processing method of the present invention, a step A of extracting an edge pixel from an edge of a model image obtained by photographing the model, a step B of retrieving a density gradient direction of each extracted edge image based on each edge pixel so as to extract an edge position in the unit of sub-pixel and a step C of registering the extraction position and the density gradient direction used for extraction of an edge image whose edge position is extracted in the step B with correspondence to the edge image are carried out preliminarily prior to processing on a processing object image.

The model image is preferred to be an image having a predetermined size, cut out from an image obtained by photographing a model as an object to be measured. The step A can extract a pixel whose density gradient is over a predetermined value as an edge pixel by scanning this model image with an edge extracting filter. If the edge extracting processing is carried out with hardware, edge extracting processing may be carried out to an entire image including the model image.

In step B, the density gradient direction is retrieved with the edge pixel as a beginning point and a position in which the quantity of change of density in that direction exceeds a predetermined threshold can be extracted as an edge position. Alternatively, it is permissible to obtain a starting point of the density change or an end point or an intermediate point of these points by differentiating the quantity of change of the density and set this as an edge position.

If plural edge pixels exist in the retrieval direction and the density gradient directions of these edge pixels are common (that is, a difference of angle between respective density gradient directions is within a predetermined value), a edge position can be obtained for these plural edge pixels. In this case, in step C, the same edge position and density gradient direction can be related to each of the plural edge pixels.

In the step C, the coordinate of an edge pixel on the model image is registered based on an extraction result of step A and the edge position and density gradient direction in the unit of sub-pixel can be registered as data supplied with the coordinate of a corresponding edge pixel. In the meantime, the density gradient direction can be expressed as an angle of a vector indicating the direction with respect to a predetermined reference vector.

According to the image processing method of the present invention, after the registration processing of the above-described model image is ended, following first, second and third steps are executed to the processing object image. The first step calculates a similarity between an image of the inspection region and a model image of each scanning position by scanning a retrieval region of the same size as the model image in the unit of pixel as a processing object image. For calculating the similarity, normalization correlative operation for the density image data and the method of the above-described patent document 1 can be used. That is, the first step is similar to a conventional position extracting processing for an object and can obtain the position of the object in the unit of pixel.

The second step sets up a retrieval region at a position extracted based on a similarity calculated in the first step again, extracts an edge pixel corresponding to an edge pixel in a model image whose edge position in the sub-pixel unit is registered in the retrieval region and executes a processing of calculating the quantity of deviation between the edge position in the sub-pixel unit obtained in step B and the registered edge position for each extracted edge pixel.

That is, of the edge pixels contained in the retrieval region, a corresponding pixel in the model image is an edge pixel and for a pixel whose edge position in the unit of pixel is related to the edge pixel, the edge position can be extracted according to the same method as performed to each model image. If plural edge pixels exist in the retrieval direction in this case, by obtaining one edge position from these plural pixels, a calculated edge position can be related to each of the plural edge pixels.

In the calculation processing of the quantity of deviation of the edge position, a difference in coordinate between the edge position and the edge position on the model image side is calculated for each edge pixel whose edge position is extracted so as to obtain an average of the differences.

In the meantime, the calculation based on the similarity includes a case of extracting a position in which the similarity is larger than a predetermined value (threshold) and a case of selecting positions in which the similarity is increased by a predetermined number from the highest one.

The third step corrects a setting position of the retrieval region according to the quantity of deviation calculated in the second step and specifies a setting position after correction as the position of the object.

As a consequence, a rough position of an object obtained in the first step can be corrected in the unit of sub-pixel so that the position of the object can be obtained accurately.

According to a preferred embodiment of the image processing method, the first step calculates a distribution pattern in the density gradient direction of each edge image of the model image and a distribution pattern in the density gradient direction of each edge pixel within the retrieval region at each scanning position.

"The distribution pattern in the density gradient direction of each edge pixel" can be constructed as pseudo image in which angular data indicating the density gradient direction of each edge pixel is related to the coordinate of each corresponding edge pixel. As regards the processing object image also, by creating a similar pseudo image and projecting the pseudo image on the model image side to the image, the similarity of a pattern at each scanning position is calculated and when the similarity is maximized, an image region which overlaps the pseudo image on the model image side can be extracted.

That is, according to the above-described embodiment, the first step is carried out according to the method described in the patent document 1. As a result, even if noise such as shading is generated or a fault such as chipping, burr is generated in the object, the position extraction in the unit of pixel can be executed accurately. That is, even if there is a deviation of position in the unit of sub-pixel, if it is found out in the unit of pixel, the position of an object can be specified accurately. Thus, the position of the object can be obtained accurately by executing the second and third steps.

According to a preferred embodiment of the image processing method, the second step sets up a retrieval region at a position in which the highest similarity is calculated in the first step again.

The image processing method of the present invention can be applied to an application of measuring the position of an object at high precision and positioning processing of the object. The method of the present invention can be applied to a case of relating feature points between stereo images for three-dimensional measurement processing by extracting a model image from an image and extracting an image region corresponding to the model image from the other image.

According to a preferred embodiment of the image processing method, it can calculate an edge position of each object of an image generated with plural cameras each having overlapping vision field and measure an object three-dimensionally by specifying a corresponding position based on the edge position of each obtained image. As a consequence, the position of an object on each image can be obtained accurately so that the accuracy of the three-dimensional position calculated from camera calibration and correspondence relation between images is improved.

The image processing apparatus of the present invention comprises: an image inputting device that inputs a density image; an edge extracting device that extracts an edge pixel and the density gradient direction of the edge pixel from an edge in a density image inputted from the image inputting device; an edge position extracting device that retrieves the density gradient direction with reference to an edge pixel on the density image based on an extraction result of the edge extracting device and extracts an edge position in the unit of sub-pixel; a memory that stores a model image including a model of an object and data extracted from the model; a registering device that creates data that when an image including the model image is inputted from the image inputting device, relates a processing result of the edge extracting device and the edge position extracting device to the inputted image to each edge pixel extracted by the edge extracting device by an edge extracting device and registers in the memory; a similarity calculating device that when a processing object image including an object corresponding to the model is inputted from the image inputting device, scans a retrieval region of the same size as the model image in the processing object image in the unit of pixel so as to calculate a similarity between an image in the retrieval region and the model image for each scanning position; a corresponding edge extracting device that sets up the retrieval region again at a position extracted based on the similarity calculated by the similarity calculating device and extracts an edge pixel corresponding to an edge pixel in the model image whose edge position is registered in the memory based on a processing result of the edge extracting device in the retrieval region; a deviation quantity calculating device that makes the edge position extracting device process an edge pixel extracted by the corresponding edge pixel extracting device and pixels in the neighborhood so as to calculate the quantity of deviation between an edge position in the unit of sub-pixel extracted from the processing and an edge position registered in the memory; and a position specifying device that corrects the setting position of the retrieval region with the quantity of deviation calculated by the deviation quantity calculating device so as to specify the setting position after a correction as a position of the object.

Further, this image processing apparatus is preferred to include a memory for image storage (hereinafter referred to as "image memory").

In the above description, the image input device can include an interface circuit for receiving an image signal from an external unit such as a camera and A/D conversion circuit. If digital image data is inputted, no AND conversion circuit needs to be provided.

The image input device and respective device excluding a memory can be constituted of computer which incorporates software for executing the processing of each device. Any device can be constituted also as a logic circuit including a transistor instead of computer. Particularly, if the edge extracting device is constituted as the logic circuit to input an image inputted from the image inputting device directly, processing with other device can be executed rapidly thereby reducing the processing time.

If an image including the model image is inputted from the image inputting device, processings corresponding to the steps A, B, C are executed by the edge extracting device, edge position extracting device and registering device. When a processing object image is inputted from the image inputting device, the first step is executed by the similarity calculating device, and the second step is executed by the edge extracting device, the edge position extracting device, the corresponding edge pixel extracting device and the deviation quantity calculating device and the third step is executed by the position specifying device. If the edge extracting device is constituted as a logic circuit, this circuit is actuated at the same time when an image is inputted and a pseudo image in which the magnitude of the density gradient and density gradient direction of each pixel are related to coordinates may be created and stored in the image memory. In this case, the other device may obtain the position of an edge pixel and the density gradient direction by accessing the pseudo image in the memory.

The above-described image processing apparatus can be provided with a device for outputting the position of an object specified by the position specifying device and a device for setting up a measurement region with reference to a specified position and executing a predetermined measurement processing in that region.

According to the present invention, after the position of an object is extracted in the unit of pixel, the quantity of deviation of the edge position in the unit of sub-pixel is obtained based on a positional relation with the model image with that position adopted as a reference and the position of an initially obtained object is corrected based on the quantity of deviation. As a consequence, the position of the object can be extracted accurately.

DETAILED DESCRIPTION OF THE PREFERRED EMBODIMENTS

Figure 1:
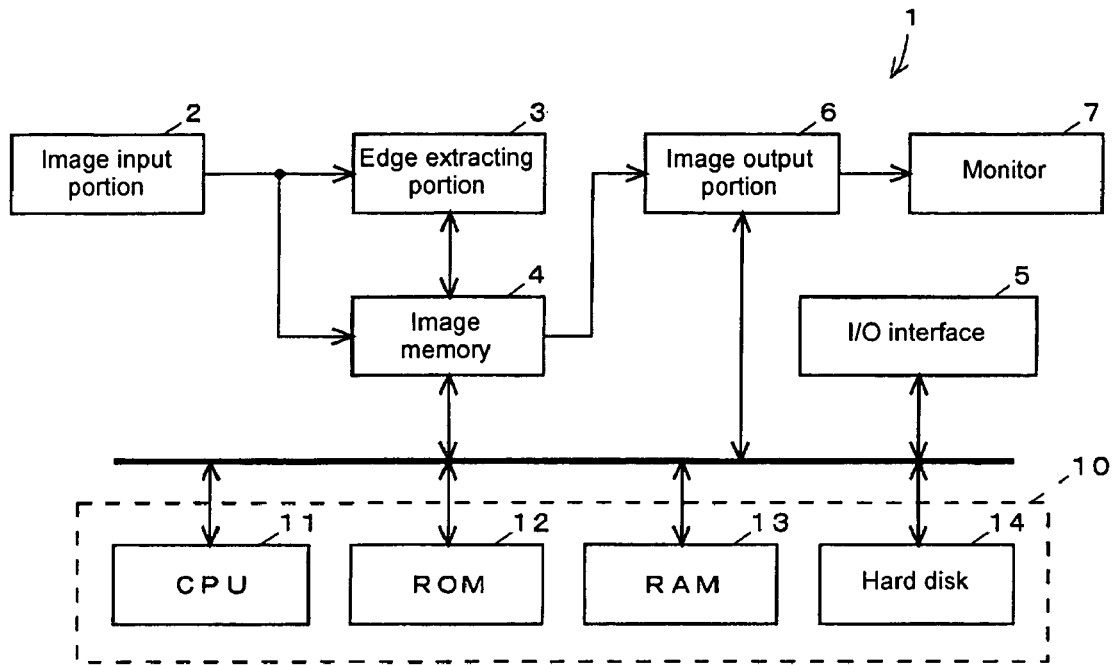
FIG. 1 is a block diagram of an image processing apparatus of the present invention.

FIG. 1 shows the structure of the image processing apparatus according to an embodiment of the present invention. This image processing apparatus 1 executes processing for measuring the position of an object on a density image with the density image obtained by photographing an object having a predetermined shape as a processing object and comprises an image input portion 2, an edge extracting portion 3, an image memory 4, an I/O interface 5, an image output portion 6, a monitor 7 and a control portion 10.

The image input portion 2 contains an interface for camera and A/D converting circuit and converts an analog signal to digital signal by inputting a density image signal from an analog camera (not shown). Digital image after conversion is stored in the image memory 4 and sent to the edge extracting portion 3.

The edge extracting portion 3 of this embodiment includes a circuit for computing the magnitude of the density of each pixel by differential processing of the digital image and a circuit for computing angular data indicating the direction of the density gradient for each pixel. That is, the magnitude of the density gradient and the density gradient direction are obtained regarding every pixel constituting the input image. These computation results are edited to pseudo image corresponding to the coordinate of each pixel and stored in the image memory 4.

In the meantime, in the track of the descriptions of the patent document 1 hereinafter, the magnitude of the density gradient is called "edge strength" and the angular data indicating the density gradient direction is called "edge code" and the pseudo image by these is called "edge strength image" and "edge code image".

The I/O interface 5 is connected to an input portion such as keyboard, mouse and the like (not shown) or an external unit. Meanwhile, the input portion is used for inputting various setting condition (including specification of a region for cutting out a model image described later) prior to measurement.

The image output portion 6 contains a D/A converting circuit and an interface circuit. This image output portion 6 reads out a predetermined kind of image data from the image memory 4 corresponding to an instruction from the control portion 10 and displays this on the monitor 7. Additionally, data such as measurement result can be received from the control portion 10 and displayed on the monitor 7.

The control portion 10 is comprised of CPU 11, ROM 12, RAM 13 and a hard disk 14. Program for measurement processing and setting data are stored in the hard disk 14 and the CPU 11 executes a series of measurement processing using these. Further, a region for registering a model data for use for extracting an object is set up in the hard disk 14 (hereinafter this region is referred to as "registration area")

Figure 2:
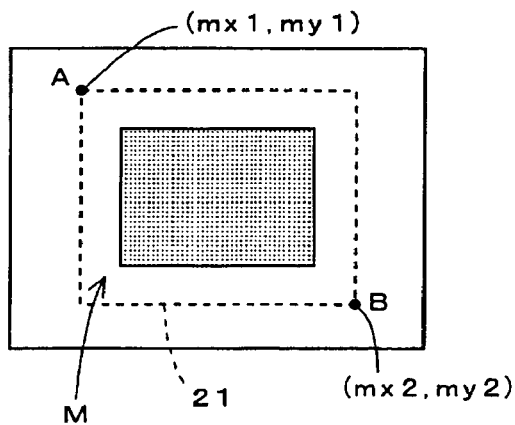
FIG. 2 is an explanatory diagram showing an example of a registration object image and processing object image.
Figure 2:
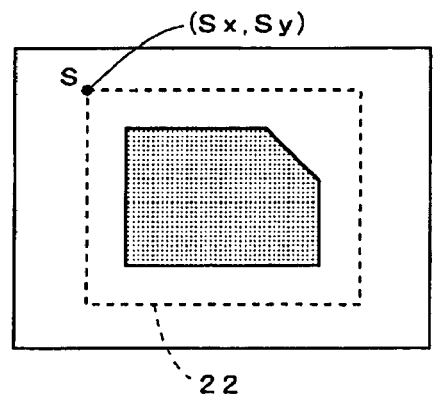

The measurement processing by the aforementioned image processing apparatus 1 will be described in detail. FIG. 2 shows an example of density image for use in registration of the model image (hereinafter referred to as "registration object image") and an example of density image of a measurement object (hereinafter referred to as "processing object image").

The registration object image is obtained by photographing a good product model of a measurement object. The aforementioned CPU 11 displays this registration object image on the monitor 7 and accepts a region specification operation by user. When the specification operation is carried out, an image within the specified region 21 is extracted as a model image M. This model image M is registered in a registration area of the hard disk 14 with the coordinate (mx1, my1) a left top vertex A of the region 21 and the coordinate (mx2, my2) of a right top vertex.

The measurement processing extracts an image region 22 corresponding to the model image M from a processing object image as shown in FIG. 2(2). Then, a coordinate (Sx, Sy) of the left top vertex S of this region 22, that is, a position corresponding to a point A of the region 21 is assumed to be a temporary position of the object. According to this embodiment, a deviation of position between an edge of the region 22 and an edge in the model image in the sub-pixel unit is extracted and a point apart from the temporary position s by an amount corresponding to the deviation of the position is set up as a real position of the object (hereinafter, the coordinate of this real position is assumed to be (Ox, Oy).

Processing for obtaining the temporary position S on the aforementioned object and processing for obtaining the deviation of position between the edges use data based on the edge pixel on the image or density gradient direction. Hereinafter, data used in a series of processing will be described in succession.

First, the basic data is the aforementioned edge code image and edge strength image. These images are generated by the edge extracting portion 3 as described previously. The edge extracting portion 3 scans an image inputted from the image input portion 2 with a mask having a predetermined size to extract density gradients Ex(x, y) and Ey (x, y) of x-axis (axis along the horizontal direction) and y-axis (axis along the vertical direction) by applying an edge extracting filter such as Sobel operator to an image in the mask. Further, the edge extracting portion computes the edge strength and edge code using the density gradient Ex(x, y) and Ey(x, y).

To compute the edge strength and edge code, a method described in the above-described patent document 1 can be applied. The edge strength expresses the length of synthetic vector of the density gradients Ex(x, y) and Ey(x, y) although the detailed description is omitted. The edge code indicates the direction of the synthetic vector and is expressed with an angle viewed from a predetermined reference direction (for example, positive direction of x-axis) (although the patent document 1 is different from this embodiment in that a direction perpendicular to the density gradient direction is assumed to be an edge code, it can be said that the concept is the same even if any direction is adopted as an edge code).

The edge strength and edge code computed for each pixel are expressed as Ei(x, y) and Ec(x, y) corresponding to the coordinate of each pixel. An image which employs these data Ei(x, y) and Ec(x, y) as the composition pixel is set up as the edge strength image and edge image.

An edge strength image and edge code image generated from the processing object image are stored in the image memory 4 together with the processing object image.

On the other hand, data within a region corresponding to the model image is extracted from the edge strength image and edge code image generated from the registration object image and stored in the registration area. Hereinafter, each pixel of the registered edge strength image is expressed with Ei(x, y) as the edge strength model image and each pixel of the registered edge code image is expressed with MEc(x, y) as the edge code model image.

Further, according to this embodiment, the position of an edge appearing in the density image is extracted in the unit of sub-pixel (hereinafter, the position of this edge is called "density edge position"). A density edge position extracted as the model image is registered in the aforementioned registration area.

Figure 3A:
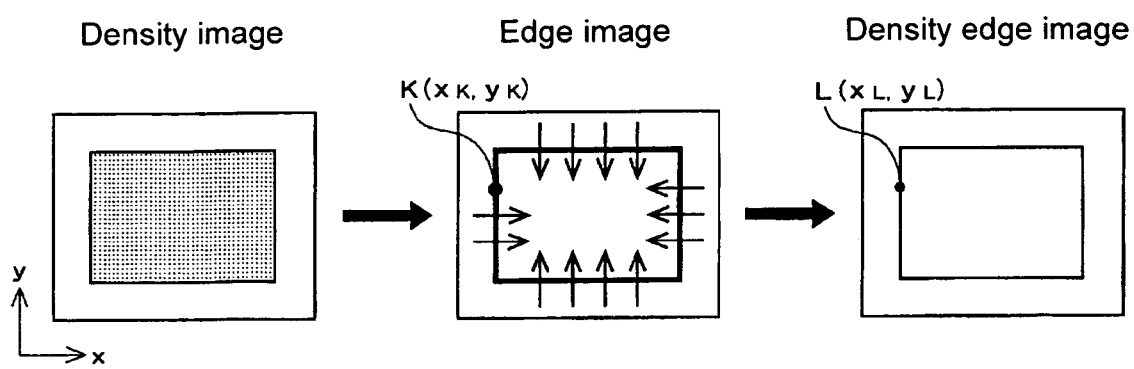
FIGS. 3A and 3B are explanatory diagrams showing an extraction method of edge pixel, density edge position and density edge position with an image.

FIG. 3(A) shows the density image including an image of the object, edge image produced as a result of conversion from this density image and density edge image as a result of narrowing an edge on the edge image using the density edge position in this order. Of these three kinds of the images, the edge image and density edge image are set for description of the edge pixel and density edge position but are not generated in this embodiment.

The edge image can be generated by converting the aforementioned edge strength image. More specifically, a pixel whose edge strength is more than a predetermined threshold $Ei_0$ is turned to a black pixel as the edge pixel and a pixel whose edge strength is below the threshold $Ei_0$ is turned to white pixel. In the meantime, the density gradient direction in the edge model image shown in the same Figure is indicated with an arrow.

Figure 3B:
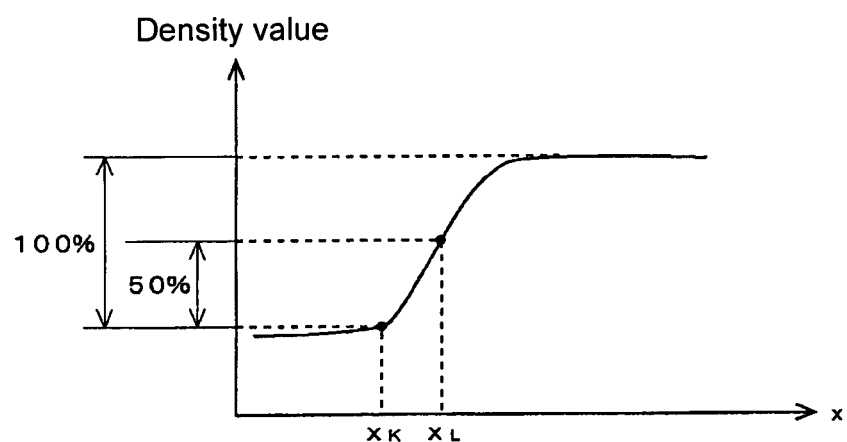

FIG.3(B) shows a method for obtaining a density edge position of an arbitrary edge pixel (whose coordinate is assumed to be ($x_k$, $y_k$) in the edge image. In this example, the density gradient direction is extracted with the aforementioned edge pixel K as a beginning point and a point L in which the quantity of change of the density value viewed from the edge pixel K reaches 50% the entire quantity of change is extracted and the coordinate ($x_L$, $y_L$) of this point L is set as the density edge position. In the meantime, the standard for determining the density edge position can be changed appropriately.

The density edge image shown in FIG. 3(A) indicates a density edge position obtained in the above-described way for each edge pixel (this cannot be indicated as an image because actually it is a position in the unit of sub-pixel).

Because in the image shown in FIG. 3, the density gradient direction is along the x-axis or y-axis, one of the coordinates ($x_L$, $y_L$) of the density edge position is the same as the edge pixel on which attention is paid. If the density gradient appears in an oblique direction, the density edge positions both in the x-axis direction and the y-axis direction need to be obtained using changes in the edge strength along the direction.

Because usually the edge of the edge image has a width corresponding to several pixels, the processing for obtaining the density edge position has a possibility that an edge pixel having the same density gradient direction may exist in a retrieval direction of the density edge position. In such a case, preferably, plural edge pixels having a common density direction are assumed as a group and a density edge position is obtained about that group. Alternatively, after narrowing processing to turn an edge width in an edge image to a pixel is carried out, a density edge position may be obtained to that narrowed edge. In this case, the processing of retrieving the density edge position is preferred to retrieve both in the positive and negative directions about the density gradient direction with an edge pixel left by the narrowing processing as a beginning point.

According to this embodiment, using the edge strength image and edge code image, the density edge positions ($x_L$, $y_L$) are extracted according to the method of FIG. 3(B) with attention paid to pixels whose edge strength is over the aforementioned threshold $Ei_0$. Further, regarding the model image, the edge image and density edge position are matched with each other by storing the extracted density edge position ($x_L$, $y_L$) in two-dimensional arrangement data $MX_L$ (x, y), $MY_L$ (x, y) using the coordinates (x, y) of the aforementioned edge pixel. That is, it comes that $MX_L(x, y)=x_L$ and $MY_L(x,y)=y_L$.

In the meantime, if a single edge position is obtained for a group of edge pixels corresponding to several pixels as described above, the density edge position can be matched with all pixels which constitute that group.

Further, regarding the model image also, a flag data ML(x, y) indicating whether or not the density edge position is set up is provided about all the composition pixels including pixels other than the edge pixel. The density edge positions $MX_L$(x, y) and $MY_L$(x, y) of this model image and the flag data ML(x, y) are registered in the registration area and used for measurement processing.

In addition to the model image, edge strength model image MEi (x, y), edge code model image MEc(x, y), density edge position $MX_L$ (x, y), $MY_L$ (x, y) and flag data ML (x, y) are registered in the registration area of the hard disk 14. Regarding the processing object image, the edge strength image Ei (x, y) and edge code image Ec (x,y) are generated by the edge extracting portion 3 at the same time when an image is inputted.

Next, specific examples of measurement processing using a variety of data will be described.

The processing of extracting a temporary position S of an object from a processing object image extracts a region most similar to the model image using the edge strength image Ei (x, y), the edge code image Ec(x, y), edge strength model image MEi (x, y) and edge code model image MEc (x, y). More specifically, a retrieval region of the same size as the model image in the processing object image is scanned in the unit of pixel so as to obtain similarity of distribution pattern of the edge code between the retrieval region and model image for each scanned position and a scanned position having the largest similarity is extracted.

Because this extraction processing is carried out in the same manner as described in the patent document 1, detailed description thereof is omitted.

Next, a retrieval region is set up again with the aforementioned temporary position S as a standard and the quantity of deviation of the edge with respect to the model image is obtained in this retrieval region so as to obtain a real position of the object. Hereinafter, this processing will be described in detail with reference to FIG. 4. dx in FIG. 4 indicates the quantity of deviation of the position in the x direction and dy indicates the quantity of deviation of the position in the y direction. The n is the quantity of extractions of the density edge positions. (Sx, Sy) is a coordinate of the point S indicating the temporary position of the object and (x, y) indicates a relative position of a pixel on which attention is paid with respect to this point S. It is considered that a corresponding point of the attention paid pixel on the model image side is expressed by this (x, y).

First, an initial value 0 is set to the aforementioned n, dx, dy in first ST101 (ST is an abbreviation of step) and following processing is executed for each attention paid pixel by moving the attention paid pixel by each pixel with the point S as a beginning point (each step of ST102, ST103, ST104, ST111, ST112, ST113, ST114). In the meantime, whether or not the values of x, y reach sizes (mx2-mx1), (my2-my1) of a model image shown in FIG. 2 is determined in ST111, ST113 (the same thing can be said of ST218, ST220 of FIG. 5 described later).

First, whether or not the flag data ML (x, y) is set to ON about corresponding pixel on the model image side is determined (ST105). In the meantime, when the flag data ML (x, y) is "1", it is assumed that the data is turned to ON.

If the ML(x, y)=1, that is, the density edge position ($MX_L$ (X, y), $MY_L$(x, y)) is related to the corresponding pixel on the model image side, ST105 turns to "YES" so that the procedures proceeds to ST106, in which whether or not the attention paid pixel is an edge pixel is determined. More specifically, if the pixel Ei (Sx+x, Sy+y) of the edge strength image generated from the processing object image is over the threshold $Ei_0$, the attention paid pixel is determined to be an edge pixel.

If ST106 is "YES", the edge code Ec (Sx+x, Sy+y) of the attention paid pixel is compared with an edge code Mc (x, y) of a corresponding pixel on the model image side. Here, if an absolute value of a difference between the Ec(Sx+x, Sy+y) and MEc(x, y) is below a predetermined value, it is determined that the both edge codes coincide with each other and the procedure proceeds to ST108.

In ST108, the density edge position ($X_L$, $Y_L$) of each attention paid pixel is extracted. Further, in next ST109, the extraction number n is incremented and the procedure proceeds to ST110.

In ST110, the quantities of deviation dx, dy of the density edge position on the processing object image side with respect to the density edge position on the model side are obtained for each axis direction of x , y using the density edge position (XL, yL) obtained in ST108, density edge positions (MXL(x, y), MYL (x, y)) of corresponding pixel on the model image side and coordinates (Sx, Sy) of the point S. At the same time, processing of adding the quantity of deviation dx, dy of each pixel is carried out in ST110.

A sum of the quantities of deviation dx, dy of the density edge position within the image region with respect to the model image can be obtained by executing the processing about all pixels in the image region corresponding to the model image. If a determination result of any step of the ST105, ST106, ST107 is "NO", ST108-ST110 are skipped.

If the processing to all the pixels in the image region corresponding to the model image is terminated, averages dx/n, dy/n of the quantities of deviation dx, dy are calculated using the aforementioned n in ST115. A coordinate obtained by adding an averaged quantity of deviation to the coordinates (Sx, Sy) of the aforementioned point S is substituted to the coordinates (Ox, Oy) indicating the real position of the object.

The above-described series of the processing enables the quantity of deviation of the edge position with respect to the model image to extracted with reference to the position of an object obtained in the unit of pixel, so that the position of the object can be corrected by the quantity of deviation. Because the position of the object can be obtained in the unit of sub-pixel, the accuracy of the position measurement can be intensified largely as compared with the conventional case.

Figure 5:
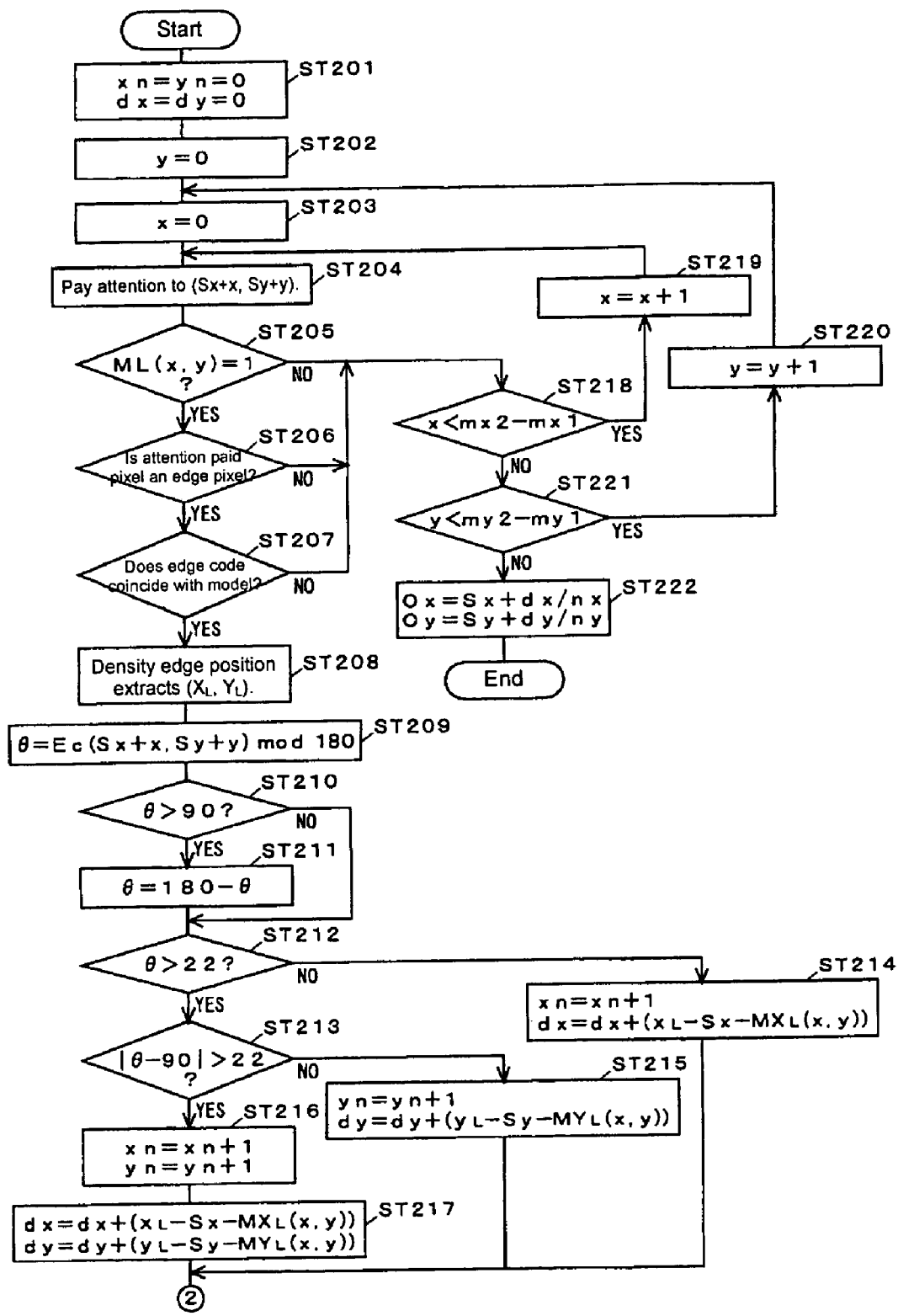
FIG. 5 is a flow chart showing other example of processing flow for extracting the position of an object in the sub-pixel unit.

FIG. 5 shows other example of the processing for obtaining the real position (Ox, Oy) of the object.

Figure 4:
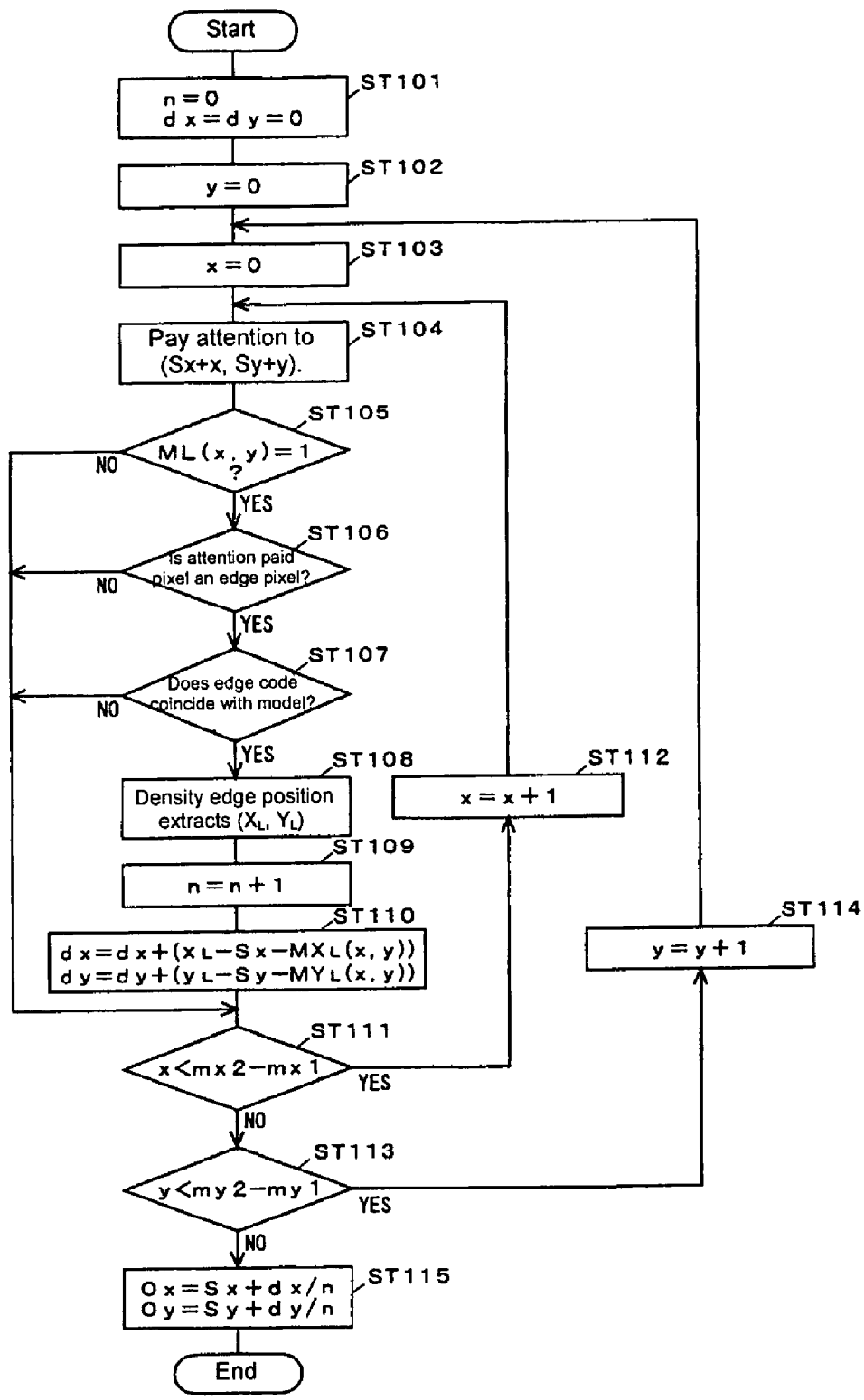
FIG. 4 is a flow chart showing an example of processing flow of extracting the position of an object in the sub-pixel unit.

This embodiment has a feature in that the calculation method of the quantity of deviation is changed depending on the direction indicated by the edge code although its basic processing content is the same as FIG. 4. According to this embodiment, to execute this method, the quantity of extractions of the density edge positions is calculated individually for each of the directions x, y. In the same Figure, xn indicates the number of extractions in the x direction and yn indicates the number of extractions in the y direction. Other parameters are the same as FIG. 4.

First, after the same setting as ST101-104 in FIG. 4 is carried out in ST201-204, following processing is executed for each pixel within the region 22 corresponding to the model image by moving x, y one by one In ST205-207, whether or not a density edge position is set in a corresponding pixel on the model image side, whether or not the attention paid pixel is an edge pixel and whether or not the edge code of the attention paid pixel coincides with the edge code in the corresponding pixel are determined like ST105-ST107 of FIG. 4. If the determination results of ST205-207 are all "YES", the procedure proceeds to ST208, in which the density edge positions ($x_L$, $y_L$) of the attention paid pixel are extracted.

In next ST209, the edge code Ec (Sx+x, Sy+y) of the attention paid pixel is divided by 180° indicating the horizontal direction and its residue number is assumed to be θ. Further, if this θ is larger than 90°, the value of θ is updated by a value obtained by subtracting θ from 180° in ST211. Next, whether or not θ is larger than 22° is determined in ST212 and if its determination result is "NO", the procedure proceeds to ST214. If the determination result is "YES", the value of |θ−90| is compared with 22° in ST213 and if |θ−90|≦22°, ST215 is executed and if |θ−90|>22°, ST216 and ST217 are executed.

If a difference of angle between a direction indicated by the edge code of an attention paid pixel and the x-axis direction (direction of 0° or 180°) is less than 22°, the procedures proceeds to ST214 assuming that the density gradient direction of the attention paid pixel runs along the x-direction and the quantity of deviation in the x direction and the extraction number xn are updated. If the difference of angle between the direction of the edge code of the attention paid pixel and the y direction (direction of 90° or 270°) is less than 22°, the procedure proceeds to ST215 assuming that the density gradient direction of the attention paid pixel runs along the y direction, in which the quantity of deviation dy in the y direction and the extraction number yn are calculated. If the edge code of the attention paid pixel has a larger difference of angle than 22° (for example, 22°<θ<68°) for any of four directions (each direction of 0°, 90°, 180°, 270°) corresponding to the x axis and y axis, the extraction numbers xn, yn of both x and y are updated in ST216 and the quantities of deviations dx, dy of both x and y are updated in ST217.

If all pixels in the image region corresponding to the model image are processed finally, the quantities of deviations dx, dy are averaged with the extraction numbers xn, yn and the coordinates obtained by correcting the coordinates (Sx, Sy) of the point S with the average value are substituted to the real positions (Ox, Oy) of the object.

Because according to the above-described procedure, the extraction number is counted only in a direction in which a deviation to the model occurs, the reliability of the average values of the quantities of deviations dx, dy can be raised. Thus, the position of the object can be obtained more accurately.

This image processing can be used when measuring the three-dimensional position of the object (three-dimensional measurement with so-called stereo camera) with images obtained by photographing the same object from plural different positions. As a method for obtaining a corresponding point between the plural images, this image processing can be applied when using a method for finding out a corresponding point by matching an image of an object in a camera image with an image of an object in other camera image. Its example will be described below.

Figure 6:
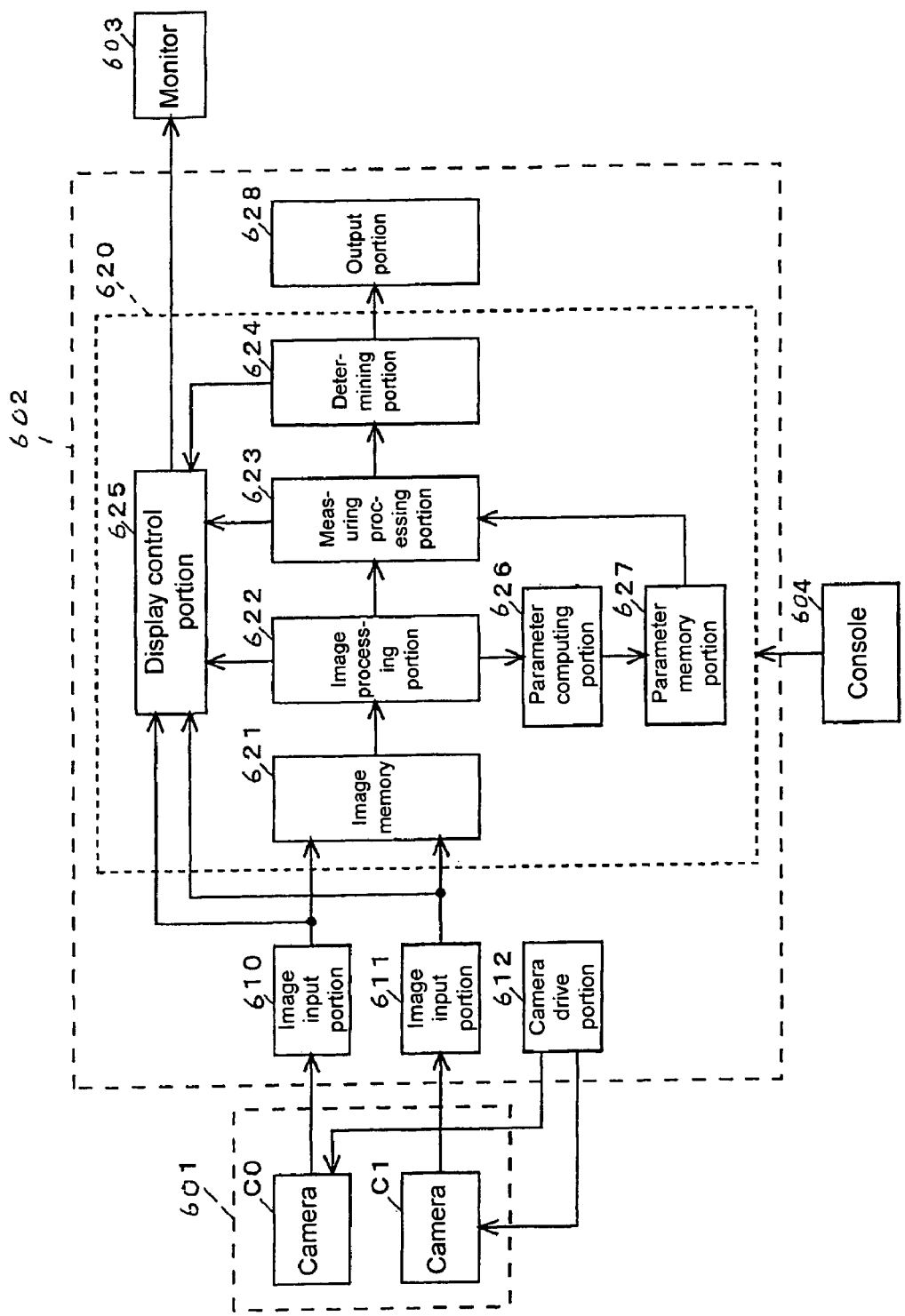
FIG. 6 is a block diagram of other image processing apparatus of the present invention.

FIG. 6 is a block diagram showing the entire structure of the inspection apparatus of other embodiment. A photographing portion 601 has two cameras C0, C1 and is installed above an inspection line for photographing inspection objects W (hereinafter referred to as "work W") carried by an inspection line L in factory successively. One camera C0 is installed in a condition in which its optical axis is directed perpendicularly to the inspection line although not shown. The other camera C1 is installed in a condition in which its optical axis is inclined such that its vision field overlaps that of the camera C0. An image A0 from the camera C0 is called "front view image A0" and an image A1 from the camera C1 is called "oblique image A1". This inspection apparatus comprises the photographing portion 1, a main body portion 602, a monitor 603 and a console 604. The main body portion 602 is provided with image input portions 610, 611 to the respective cameras C0, C1, a camera drive portion 612, an arithmetic processing portion 620 and an output portion 628. The camera drive portion 612 drives the respective cameras C0, C1 by receiving an inspection signal from a work detection sensor (not shown). An image signal generated by the respective cameras C0, C1 is inputted to the image input portions 610, 611 and converted to digital signal. As a consequence, digital image for measurement processing of each camera (the aforementioned front view images A0 and A1) is generated.

The arithmetic operation processing portion 620 is constituted of computer and after executing the measurement processing using an image of each camera, determines whether or not the work W is suitable from its processing result. The output portion 628 is an interface for outputting a result of the measurement processing or determination processing to an external apparatus such as PLC.

The arithmetic operation processing portion 620 includes an image memory 621 for storing the images A0, A1, an image processing portion 622, a measurement processing portion 623, a determining portion 624, a display control portion 625, a parameter calculating portion 626, and a parameter memory portion 627. Other portions than the image memory 621 and the parameter memory portion 627 are functions set in the computer by a specialized program.

The image memory 621 and the parameter memory portion 627 are set in a memory of the computer (RAM or the like).

The arithmetic operation processing portion 620 is provided with a memory for registering information necessary for inspection (setting condition of inspection region, model image and the like) although not shown in FIG. 6 (hereinafter this memory is called "registration memory"). The registration processing to this registration memory and setting or change of a processing which each processing portion of the arithmetic operation processing portion 620 executes can be carried out corresponding to an operation of the console 4.

The image processing portion 622 extracts a composition point of an inspection object portion of the work W by binarization, edge extraction, or pattern matching. The measurement processing portion 623 executes a processing of measuring the position and size of an inspection object portion extracted by the image processing portion 622. In the meantime, the image processing portion 622 and the measurement processing portion 623 of this embodiment are set to be capable of selecting and executing the two-dimensional and three-dimensional processing.

The determining portion 624 determines whether or not the work W is acceptable by comparing a measurement result of the measurement processing portion 623 with a predetermined threshold. This determination result is outputted to the output portion 628 and the display control portion 625.

The display control portion 625 controls the display operation of the monitor 603 and can display the front view image A0 and oblique image A1 generated by the image input portions 610, 611 within a signal screen. Further, it can display processing results of the image processing portion 622, the measurement processing portion 623 and the determining portion 624 and can display them with an image.

A variety of coefficients contained in an arithmetic expression for three-dimensional measurement are stored in the parameter storage portion 627. The values of these coefficients vary corresponding to the relation between the stereo coordinate system constituted of respective cameras and spatial coordinate system indicating the position in an actual space (distance between home positions of respective coordinates, deviation of rotation of the stereo coordinate system with respect to the spatial coordinate system and the like) (hereinafter, these coefficients are called "parameter") These parameters are calculated by the image processing portion 622 and the parameter calculating portion 626 prior to inspection and stored in the parameter storage portion 627. In the meantime, a calibration work having plural feature points is used for processing for calculating this parameter.

Further, a parameter constituting homography matrix is registered in the parameter storage portion 27.

Figure 7:
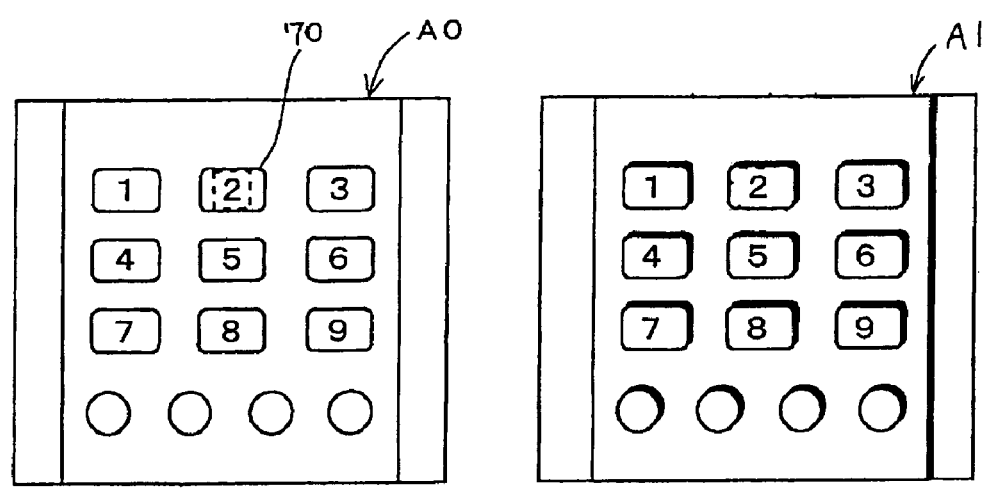
FIG. 7 is an explanatory diagram of an image at the time of inspection and an image showing an inspection region.

Next, an inspection processing in a case of, with a work (remote controller, telephone and the like) in which pushbutton character keys are disposed as shown in FIG. 7 as an inspection object, measuring the height of the keys will be described.

First, a region 70 (key "2" in this case) including a key of a measuring object is specified using a front view image A0 obtained by photographing the work W. Then, an image is generated by driving the cameras C0, C1 at the same time and regarding the front view image A0, the edge position of the object (key "2" in this example) within the region 70 is obtained in the unit of sub-pixel according to the same method as the above-described embodiment. On the other hand, because the oblique image A1 has parallax, the displacement is corrected using an internal constant obtained by the preliminary camera calibration so as to create a corresponding displacement correction image as viewed from front (see, for example, non-patent document 2).

Non-patent document 2: "Digital Photogrammetry: stereo image method" by Takachi, the 15$^{th}$ three-dimensional Engineering Symposium Reference Materail, 2005. 12, pp 15-32

The edge position is obtained in the unit of sub-pixel for this displacement correction image like the previously embodiment. Because at that stage, only the edge position is secured for each edge pixel of the displacement correction image, the edge position corresponding to the edge position of the sub-pixel which is an inspection object obtained by the camera 0 is calculated by supplement from each edge position of the obtained displacement correction image. As a consequence, correspondence between an object on an image of the camera C0 and the position of an object on the displacement correction image obtained by the camera C1 can be obtained in the unit of sub-pixel. To obtain a corresponding position, so-called epipollar constraint condition is used. Further, a search region for the corresponding point can be limited based on information about the height range which a measurement object can obtain. The position (edge position) of an object on the displacement correction image obtained in this way is converted to an image before the displacement correction so as to obtain an image position of an object in the coordinate system of the camera C1. If well-known three-dimensional position measurement processing is carried out based on corresponding points of the camera C0 and camera C1 obtained in the unit of sub-pixel, the three-dimensional position measurement can be carried out at high accuracy.

More specifically, following processings (1)-(5) are carried out.

(1) A model image is registered based on a front view image obtained with the camera C0.

(2) For the processing object image obtained with the camera C0, the real position of the object is obtained in the unit of sub-pixel using the model image like the above-described embodiment. As a consequence, the edge position of the model image in the image of the camera C0 can be obtained in the unit of sub-pixel.

(3) A processing object image obtained with the camera C1 is corrected in displacement. By this displacement correction, the oblique image of the camera C1 is converted to the same front view image as the image of the camera C0.

The displacement correction (sometimes called epipollar image correction) is carried out by correction by coordinate conversion with respect to an image of one camera such that a photographing face of one camera is on the same coordinate system as the photographing face of the other camera and on the same plane. Further, the images of both the photographing faces may be subjected to coordinate conversion such that they are on the same coordinate system as a specific photographing face and on the same plane.

The stereo three-dimensional position measurement in which one image is a view taken vertically while the other image is taken obliquely as mentioned in this embodiment executes correction of converting an oblique image of the camera C1 to the same front view image as the image of the camera C0. As a result of this correction, the epipollar line on the image of the camera C1 when searching for a corresponding point turns to horizontal direction. More specifically, because rotation and translation relations between the coordinate system of the photographing face of the camera C0 and the coordinate system of the photographing system of the camera C1 can be obtained by calibration of the stereo camera performed preliminarily, displacement correction image is generated by processings 1) to 3) using these relations.

1) Coordinates $a_i$, $b_i$, $c_i$, and $d_i$ on an image of the camera 1 to be converted to the coordinate positions of the four corners $A_i$, $B_i$, $C_i$, $D_i$ of a pixel I of a displacement correction image to be generated are calculated using a relation obtained by calibration preliminarily.

2) An average density of a region surrounded by $a_i$, $b_i$, $c_i$ and $d_i$ on an image of the camera 1 (hereinafter referred to as abcd region) is obtained. Because the abcd region spreads over plural pixels of the camera 1 (usually, it is considered to spread over four pixels), the density of a pixel i on the displacement correction image is determined by summing up the density values of each pixel while weighting the ratio of an area included in the abcd region of each pixel.

3) The processings 1) and 2) are repeated for all pixels of the displacement correction image to be generated.

(4) The position of an object is obtained to a displacement correction image obtained by the above displacement correction, in the unit of sub-pixel like (2). As a result, the edge position of the model image in the displacement correction image can be obtained in the unit of sub-pixel.

At this time, the search region of the model image is set in a range specified by each pixel on the image of the camera C0 or epipollar line corresponding to a typical pixel of the model image matched within an image of the camera C0. The search region may be set up with a direction perpendicular to the epipollar line having an allowance similar to one to several pixels. If a detection distance (distance between the camera and detection object) is limited to a specified range, a region corresponding to the distance range may be calculated using homography matrix so as to search in only that region. Although the coordinate of the position of a model image within an image of the camera C0 and the coordinate of the position of a model image within the displacement correction image of the camera 1 are obtained in the unit of sub-pixel by processing described up to here and the coordinates of corresponding edge positions within the both images are obtained in the unit of sub-pixel, a corresponding point needs to be grasped in not the coordinate system in the displacement correction image of the camera 1 but the coordinate system of an original image of the camera 1 for three-dimensional position measurement. Thus, the coordinate system of a correction image is converted inversely to the coordinate system of the camera 1. This inverse conversion is carried out by calculation using a relation obtained by calibration preliminarily. Because the inverse conversion is performed by calculation, if the edge position in the correction image is obtained in the unit of sub-pixel, the coordinate of the edge position calculated by the inverse conversion on the image of the camera 1 can be obtained at an accuracy of sub-pixel. The three-dimensional position coordinate is obtained from the coordinate of the edge position in this model image in the unit of sub-pixel and the corresponding coordinate of the edge position on the image of the camera C in the unit of sub-pixel. In (4), a region in the image of the camera 0 corresponding to the model image found out from the processing object image in the image of the camera C0 may be employed as the model image instead of using the model image. Further, in (1), it is permissible to extract an image in a range specified preliminarily of the processing object image of the camera C0 every time instead of the model image and use this instead of the model image.

According to this embodiment, it is assumed that one image is a front view image and the other image is an oblique image. Even if there exists no front view image depending on the position or angle of a camera installed, needless to say, a corresponding position can be obtained in the unit of sub-pixel by obtaining a displacement correction image projected to the same plane for each camera image.

What is claimed is:

1. A method for, with a gray image of a predetermined size as a processing object, extracting the position of an object corresponding to a preliminarily specified model from the processing object image, wherein after a step A of extracting an edge pixel from an edge of a model image obtained by photographing the model;

a step B of retrieving a density gradient direction of each extracted edge pixel based on each edge pixel so as to extract an edge position in the unit of sub-pixel; and a step C of registering the extraction position and the density gradient direction used for extraction of an edge pixel whose edge position is extracted in the step B with correspondence to the edge pixel are carried out preliminarily, first, second and third steps are carried out to the processing object image, the first step calculating similarity between the image of a retrieval region and the model image of each scanning position by scanning the retrieval region of the same size as the model image in the unit of pixel as a processing object image, the second step resetting up a retrieval region at a position extracted based on the similarity calculated in the first step, extracting an edge pixel corresponding to an edge pixel in a model image whose edge position in the sub-pixel unit is registered in the retrieval region, extracting an edge position in the unit of sub-pixel by retrieving the density gradient direction of each extracted edge pixel based on each edge pixel, and executing a processing of calculating the quantity of deviation between the edge position in the sub-pixel unit thus obtained and the registered edge position for each extracted edge pixel, the third step correcting a setting position of the retrieval region according to the quantity of deviation calculated in the second step and specifying a setting position after correction as the position of the object.

2. The image processing method according to claim 1 wherein the first step calculates similarity between a distribution pattern in the density gradient direction of each edge pixel of the model image and a distribution pattern in the density gradient direction of each edge pixel within the retrieval region at each scanning position.

3. The image processing method according to claim 1 wherein the second step resets up a retrieval region at a position in which the highest similarity is calculated in the first step.

4. A three-dimensional position measuring method for calculating an edge position of each object of an image generated with plural cameras each having overlapping vision field in accordance with the image processing method of claim 1 and measuring an object three-dimensionally by specifying a corresponding position based on the edge position of each obtained image.

5. The image processing method according to claim 1, wherein the step B comprises, when plural edge pixels have a common density direction, combining the plural edge pixels into a group and extracting a point in which the quantity of change of the density value reaches the predetermined value of the entire quantity of change, as an edge position in the unit of sub-pixel for the group.

6. An image processing apparatus comprising:

an image inputting device that inputs a density image;

an edge extracting device that extracts an edge pixel and the density gradient direction of the edge pixel from an edge in a density image inputted from the image inputting device;

an edge position extracting device that retrieves the density gradient direction with reference to an edge pixel on the density image based on an extraction result of the edge extracting device and extracts an edge position in the unit of sub-pixel;

a memory that stores a model image including a model of an object and data extracted from the model;

a registering device that creates data that when an image including the model image is inputted from the image inputting device, relates a processing result of the edge extracting device and the edge position extracting device to the inputted image to each edge pixel extracted by the edge extracting device by an edge extracting device and registers in the memory;

a similarity calculating device that when a processing object image including an object corresponding to the model is inputted from the image inputting device, scans a retrieval region of the same size as the model image in the processing object image in the unit of pixel so as to calculate a similarity between an image in the retrieval region and the model image for each scanning position;

a corresponding edge extracting device that resets up the retrieval region at a position extracted based on the similarity calculated by the similarity calculating device and extracts an edge pixel corresponding to an edge pixel in the model image whose edge position is registered in the memory based on a processing result of the edge extracting device in the retrieval region, and that extracts an edge position in the unit of sub-pixel by retrieving the density gradient direction of each extracted edge pixel based on each edge pixel;

a deviation quantity calculating device that makes the edge position extracting device process an edge pixel extracted by the corresponding edge pixel extracting device and pixels in the neighborhood so as to calculate the quantity of deviation between an edge position in the unit of sub-pixel extracted from the processing and an edge position registered in the memory; and a position specifying device that corrects the setting position of the retrieval region with the quantity of deviation calculated by the deviation quantity calculating device so as to specify the setting position after a correction as a position of the object.

7. The edge position extracting device according to claim 6, wherein the edge position extracting device is configured to, when plural edge pixels have a common density direction, combine the plural edge pixels into a group and extract a point in which the quantity of change of the density value reaches the predetermined value of the entire quantity of change, as an edge position in the unit of sub-pixel for the group.

* * * * *